US009298831B1

(12) United States Patent
Heldt et al.

(10) Patent No.: US 9,298,831 B1
(45) Date of Patent: Mar. 29, 2016

(54) APPROXIMATING A USER LOCATION

(71) Applicant: Google Inc., Mountain View, CA (US)

(72) Inventors: Lukasz Andrzej Heldt, Stallikon (CH); Krzysztof Duleba, Pfaffikon (CH); David Robert Bailey, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 180 days.

(21) Appl. No.: 14/105,255

(22) Filed: Dec. 13, 2013

(51) Int. Cl.
*G06F 17/30* (2006.01)
(52) U.S. Cl.
CPC .... *G06F 17/30864* (2013.01); *G06F 17/30241* (2013.01); *G06F 17/30598* (2013.01); *G06F 17/30867* (2013.01)
(58) Field of Classification Search
CPC .......... G06F 17/3071; G06F 17/30864; G06F 17/30598; G06F 17/30867; G06F 17/30241
USPC .................................. 707/737, 728, 769, 770
See application file for complete search history.

(56) References Cited

U.S. PATENT DOCUMENTS

| 7,743,048 | B2 * | 6/2010 | Baldwin | G06F 17/3087 |
| | | | | 707/713 |
| 8,301,639 | B1 * | 10/2012 | Myllymaki | G06F 17/3097 |
| | | | | 707/748 |
| 8,521,680 | B2 * | 8/2013 | Lin | G06N 5/04 |
| | | | | 706/55 |
| 8,635,201 | B2 * | 1/2014 | Regan | G06F 17/3087 |
| | | | | 707/706 |
| 8,972,391 | B1 * | 3/2015 | McDonnell | G06F 17/3053 |
| | | | | 707/727 |
| 2002/0123988 | A1 * | 9/2002 | Dean | G06F 17/30864 |
| | | | | 707/769 |
| 2005/0065916 | A1 * | 3/2005 | Ge | G06Q 30/0251 |
| | | | | 707/669 |
| 2005/0071417 | A1 * | 3/2005 | Taylor | G06Q 30/02 |
| | | | | 709/200 |
| 2005/0108213 | A1 * | 5/2005 | Riise | G06F 17/3087 |
| | | | | 707/669 |
| 2006/0224583 | A1 * | 10/2006 | Fikes | G06F 17/30876 |
| | | | | 707/749 |
| 2006/0224587 | A1 * | 10/2006 | Zamir | G06F 17/30867 |
| | | | | 707/752 |
| 2007/0016553 | A1 * | 1/2007 | Dumais | H04L 12/5885 |
| | | | | 707/716 |
| 2008/0222119 | A1 * | 9/2008 | Dai | G06F 17/3087 |
| | | | | 707/713 |
| 2010/0257171 | A1 * | 10/2010 | Shekhawat | G06F 17/30707 |
| | | | | 707/738 |
| 2010/0287178 | A1 * | 11/2010 | Lambert et al. | 707/765 |
| 2011/0077862 | A1 * | 3/2011 | Huang | G01C 21/30 |
| | | | | 701/532 |
| 2012/0158712 | A1 * | 6/2012 | Karanjkar | G06F 17/30241 |
| | | | | 707/724 |
| 2012/0166433 | A1 * | 6/2012 | Tseng | G06Q 30/0224 |
| | | | | 707/728 |
| 2013/0013620 | A1 * | 1/2013 | Rolf | G06F 17/30241 |
| | | | | 707/748 |
| 2013/0018865 | A1 * | 1/2013 | Regan | G06F 17/30041 |
| | | | | 707/706 |
| 2013/0232006 | A1 * | 9/2013 | Holcomb | G06F 17/30864 |
| | | | | 705/14.54 |

* cited by examiner

*Primary Examiner* — Shahid Alam
(74) *Attorney, Agent, or Firm* — Dority & Manning, P.A.

(57) ABSTRACT

Systems and methods for approximating a user location are provided. For instance, historical location data and internet protocol address data can be analyzed to identify a plurality of locations. A confidence score for each of the plurality of locations can be determined. Two or more locations of the plurality of locations that form a cluster can be identified and the confidence scores for each of the two or more locations that form a cluster can be modified by adjusting each confidence score by a weight associated with the cluster.

17 Claims, 4 Drawing Sheets

APPROXIMATING A USER LOCATION

FIELD

The present disclosure relates generally to approximating a user location. In particular, the present disclosure relates to approximating a user location based on historical location data and current internet protocol address data.

BACKGROUND

Location-enhanced services are increasingly common online tools used by many people on a daily basis. In particular, location-enhanced services use knowledge of a user's location to provide an online service in a more accurate or useful manner. For example, a search engine can use knowledge of a user's location to tailor search results to reflect the most accurate or useful information for such location. As another example, when the user's location is known, a mapping application or geographic information system can provide a superior map in response to a point of interest search or a request for directions. Therefore, knowledge of a user's location is increasingly a key factor used to provide a superior online experience across a broad range of services or tools.

In the context of a traditional desktop computer, methods for determining user location are fairly established and successful. For example, geolocation by analysis of internet protocol (IP) address is a common technique which yields generally useful results.

However, in the context of mobile computing, such as, for example, a smartphone, existing systems and methods for determining a user location are much less suitable. In particular, users of mobile computing devices have high expectations regarding the ability of the computing device and its corresponding communication system to geolocate. For example, many users of smartphones consistently employ their devices to act as navigational devices or to provide real-time, location-enhanced search results when hunting for a local point of interest, such as a restaurant, hotel, or other meeting place.

Some methods of geolocation for mobile computing devices are relatively precise. For example, successful use of the global positioning system or a Wi-Fi positioning system can result in a precise location for the mobile computing device. Unfortunately, such positioning systems are simply not available or operational for a large amount of time or locations. Further, geolocation by analysis of IP address is generally not as informative for mobile device carrier IPs. In addition, requiring the user to manually correct the query by appending the desired location is slow, cumbersome, and undesirable for the user.

The above problems result in a significant amount of time in which a precise location for a mobile computing device is not available or otherwise known. Thus, without knowledge of the device's location, service providers struggle to provide location-enhanced services, resulting in user frustration and loss of optimal functionality.

SUMMARY

Aspects and advantages of the present disclosure will be set forth in part in the following description, or may be obvious from the description, or may be learned through practice of the embodiments.

One aspect of the present disclosure is directed to a computer-implemented method for approximating a user location. The method includes accessing, with one or more computing devices, information associated with a user location. The information includes historical location data and current internet protocol address data. The historical location data and internet protocol address data are analyzed to identify a plurality of locations associated with the information. A confidence score for each of the plurality of locations is determined, the confidence score expressing a probability of the consensus of the user location with the location associated with the confidence score. Two or more locations of the plurality of locations that form a cluster are identified and the confidence scores for each of the two or more locations that form a cluster are modified by adjusting each confidence score by a weight associated with the cluster.

Other aspects of the present disclosure are directed to systems, apparatus, tangible, non-transitory computer-readable media, user interfaces and devices for classifying items into one or more categories.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
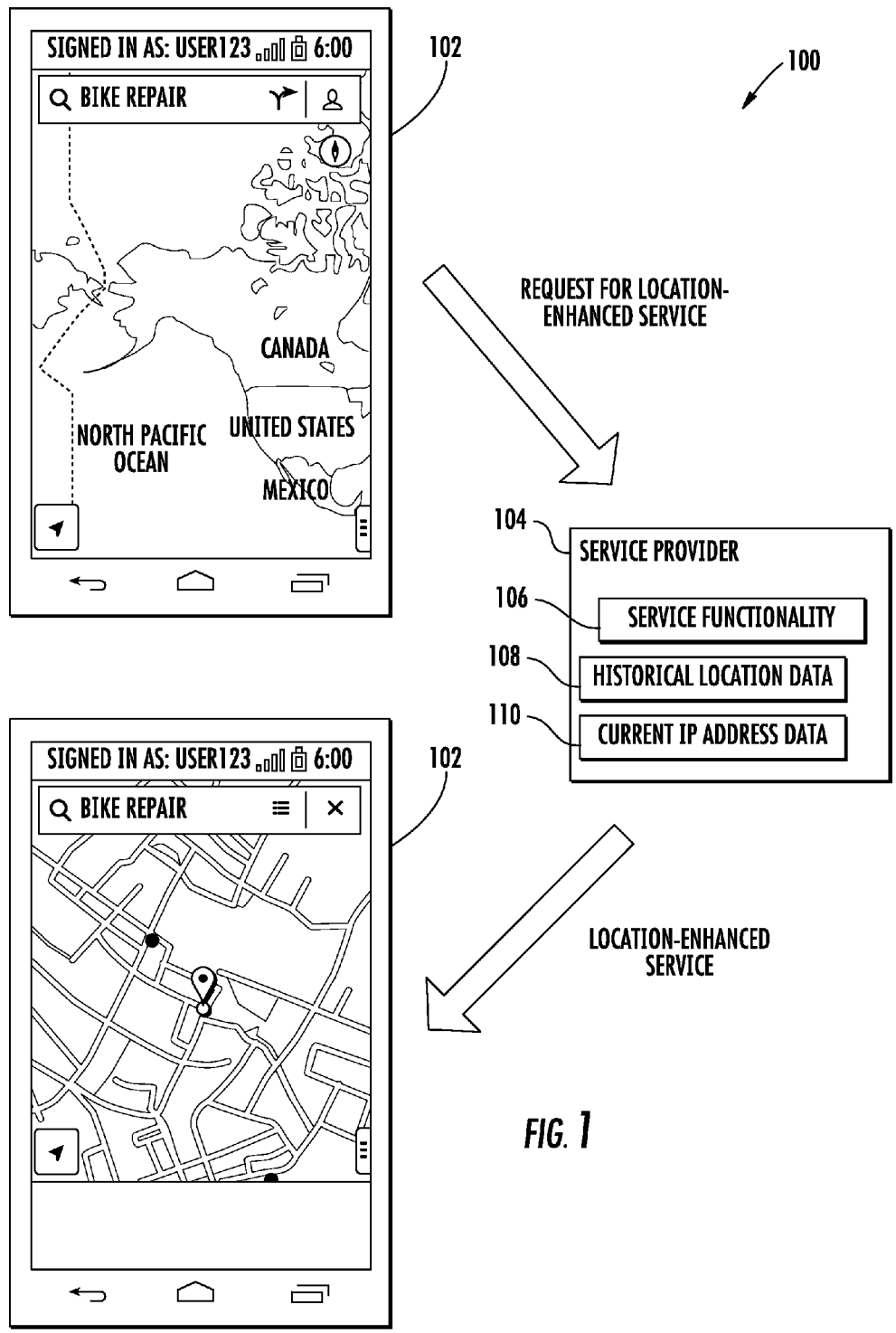
FIG. 1 depicts a graphical diagram of a client device requesting and receiving a location-enhanced service from a service provider according to an exemplary embodiment of the present disclosure.

Reference now will be made in detail to embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to systems and methods for approximating a current location of a user or device based on an analysis of a historical location data and current internet protocol (IP) address data. In particular, when the current location of a device requesting a location-enhanced service cannot be determined with sufficient precision, historical location data and current IP address data can be analyzed to identify one or more locations associated with such data. Such locations can be scored according to a variety of parameters. The scores can be adjusted when certain locations are determined to form a cluster. The location receiving the highest score can be approximated to be the current location of the user.

More particularly, after a user has chosen to participate and provided consent after being informed of what data is collected and how such data is used, historical location data and current IP address data can be generated and maintained for the user.

The historical location data can be defined by a user account associated with the user and can store one or more entries for each instance in which a device that is signed into such user account performs an online interaction or reports its location. Each entry can describe a location and time and can provide a device identifier corresponding to the particular device used at such location and time.

In certain implementations of the present disclosure, with appropriate user consent, historical location data can be in the form of a cookie. For instance, a web browser of a device can set an HTTP (HyperText Transfer Protocol) cookie.

When a request for a location-enhanced service is received from a device, it can first be determined whether a current location of such device can be determined with sufficient precision. For example, a number of various geolocation techniques can be performed. Alternatively, if a location has been recently determined for such device (e.g. within the last 5 minutes), then such recently determined location can be used. However, if the precise location of the device cannot be determined and a recent location is not available, then historical location data and current IP address data can be analyzed to assist in approximating the current location of such device.

In particular, a plurality of locations can be obtained from the historical location data and current IP address data. For example, with user consent, historical location data can include historical IP address data, historical global positioning system data, historical query data, or the like, as will be described in more detail herein. Current IP address data can be obtained by geolocation of an IP address from a client device.

Each of the locations obtained from the historical location data and current IP address data can be scored according to a scoring formula. As an example, the scoring formula can provide a score to a location based at least in part on its age, prominence, location consistency, or the like. Other parameters or components can be included as well.

Once each of the locations has been scored, scores for locations that form a cluster can be adjusted. For instance, exact or near duplicate locations can be considered a cluster with the scores for such locations being weighted based upon the cluster. Such scores can be weighted higher than scores for locations that do not form a cluster. The location that received the highest score can be selected as the current location of the device from which the request was received. Such selected location can then be used to provide the requested location-enhanced service. Thus, location-enhanced services can be effectively provided even in instances in which a current location of the device is generally unobtainable with sufficient precision according to known techniques.

Importantly, in situations in which information is collected about a user, such as historical location data and current IP address data, the user can be provided with an opportunity to control whether programs or features collect such information. In particular, such information is not collected or used unless the user provides consent after being informed of what data is collected and how such data is used. Further, the user can be provided with a tool to revoke or modify the scope of permissions. In addition, certain information or data can be treated in one or more ways before it is stored or used, so that personally identifiable information is removed or stored in an encrypted fashion.

With reference now to the FIGS., exemplary embodiments of the present disclosure will now be discussed in detail. FIG. 1 depicts a graphical diagram 100 of a client device 102 requesting and receiving a location-enhanced service from a service provider 104 according to an exemplary embodiment of the present disclosure.

A location-enhanced service can include any service provided to a client device by host server in which knowledge of the client device's location is used to enhance or adjust one or more aspects of the provided service. Exemplary location-enhanced services include, but are not limited to, identifying, filtering, or promoting web search results based on device location; providing location-specific maps or directions; identifying, filtering, or promoting point of interest search results in a mapping application or geographic information system based on device location; identifying, filtering, or promoting content or advertisements based on device location; providing personal assistant functionality by organizing and selecting for presentation information available from a range of datasources based on device location; modifying operations of an arbitrary web-service based on device location; or any other suitable location-enhanced service, including aspects of web-based email, social networking, news or other content aggregation, or other suitable services or products.

As shown in FIG. 1, exemplary client device 102 has been used to sign into a user account ("User123"). As used herein, a user account can be any account or means of identification that is associated with a user of a service which can, in turn, be associated with historical location data. Exemplary user accounts include an operating system account; an account used for purchasing and ownership of content from a content distribution platform; a web-based email account; a social media account; a financial services account; a game account; an application-specific account (e.g. a news aggregator account or an internet-radio application account); or any other suitable user account. However, as described herein, in certain implementations of the present disclosure, historical location data can be maintained in a cookie.

In one implementation, service provider 104 offers several of the services discussed above (e.g. web-based email, social media, gaming, and content distribution) and a single user account can be used to participate in, receive, or otherwise control aspects of each of such services from service provider 104.

As an example, as shown in FIG. 1, exemplary client device 102 can implement an application module to operate a mapping application. In particular, the user has entered a point of interest search query of "bike repair." By pressing or selecting an "Enter" key, a "Go" icon, or the magnifying glass icon the user can send the search query to service provider 104.

Thus, client device 102 can request a service from service provider 104 (i.e. a point of interest search in a mapping application). Further, the requested service could be enhanced using knowledge of current location of client device 102 (i.e. identify and present point of interest search results in a general vicinity of such current location).

However, the entered search query may not provide any information to determine a desired location of the point of interest. Furthermore, the current viewpoint provided by the mapping application can be significantly broad such that a desired location of the point of interest cannot be inferred from such viewpoint.

In certain instances, a current location of client device 102 cannot be determined with sufficient precision if, for example, the request for the location-enhanced service fails to identify the current location of client device 102 and other geolocation techniques such as GPS or WiFi positioning are unavailable.

According to aspects of the present disclosure, service provider 104 can analyze historical location data 108 and current IP address data 110 associated with User123 to identify locations associated with such information. Scores can then be assigned to each of the locations which express a probability of the consensus of the actual user location with the location associated its respective score. Scores for locations that form clusters can be adjusted and all of the scored locations can be ranked to approximate the current location of the client device 102. Service provider 104 can then use such approximated current location in conjunction with service functionality 106 to provide the location-enhanced service to client device 102.

In particular, as shown in FIG. 1, although the current location of client device 102 was unable to be determined with sufficient precision using traditional geolocation techniques such as GPS, the location-enhanced service (i.e. location-specific point of interest search results) was still able to be provided to client device 102 by service provider 104.

Figure 2:
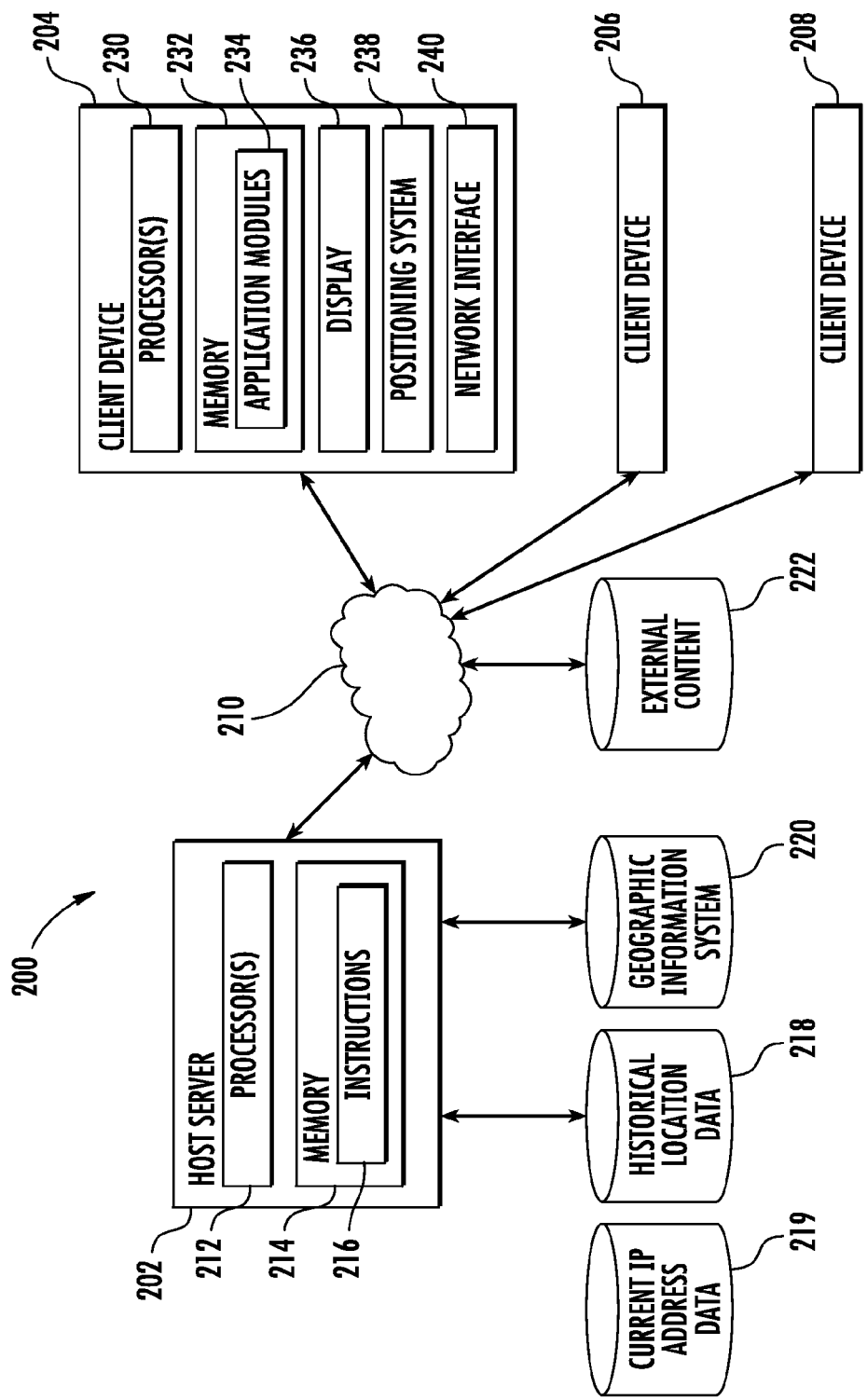
FIG. 2 depicts an exemplary system according to an exemplary embodiment of the present disclosure.

FIG. 2 depicts an exemplary system 200 according to an exemplary embodiment of the present disclosure. System 200 can include a client-server architecture, where a host server 202 communicates with one or more client devices 204, 206, and 208 over a network 210. Although three client devices 204, 206, and 208 are illustrated in FIG. 2, any number of client devices can be connected to host server 202 over network 210.

Client devices 204, 206, and 208 can be, for example, a computing device having a processor 230 and a memory 232, such as a wireless mobile device, a personal digital assistant (PDA), smartphone, tablet, navigation system located in a vehicle, handheld GPS system, laptop computer, desktop computer, computing-enabled watch, computing-enabled eyeglasses, gaming console, embedded computing system, home appliances, or other such devices/systems. In short, client device 204 can be any computer, device, or system that can interact with the host server system 202 (sending and receiving data).

Processor 230 of client device 204 can be any suitable processing device and can be one processor or a plurality of processors that are operably connected. Memory 232 can include any number of computer-readable instructions or other stored data. In particular, memory 232 can include, store, or provide one or more application modules 234. When implemented by processor 230, application modules 234 can respectively cause or instruct processor 230 to perform operations consistent with the present disclosure, such as, for example, running an application that transmits location data to host server 202 in addition to performing any number of arbitrary operations. Application modules 234 can include, for example, a mapping application or a browser application.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example, computer executable instructions that are stored in a tangible computer-readable storage medium such as RAM hard disk or optical or magnetic media.

Client device 204 can further include a positioning system 238. Positioning system 238 can determine a current geographic location of client device 204 and communicate such geographic location to host server 202 over network 210. The positioning system 238 can be any device or circuitry for analyzing the position of the client device 204. For example, the positioning system 238 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

In the instance in which the user consents to the use of positional or location data, the positioning system 238 can analyze the position of the client device 204 as the user moves around in the world and provides the user location information to the host server 202 over network 210. As will be discussed further herein, each of such location updates can be used to build historical location data for a user account associated with client device 204. Further, it should be understood that location information associated with a client device is utilized only if permission is granted after the user has been notified that location information is to be accessed and how the location information is to be utilized in the context of the present disclosure. In addition, any location information associated with users can be stored, handled, and maintained in a manner to protect user privacy.

Client device 204 can further include a network interface 240. Network interface 240 can include any suitable components for interfacing with one more networks, including for example, transmitters, receivers, ports, controllers, antennas, or other suitable components.

Host server 202 can be implemented using one or more suitable computing devices and can include a processor 212 and a memory 214. Processor 212 can be any suitable processing device and can be one processor or a plurality of processors which are operably connected. Memory 214 can store instructions 216 that cause processor 212 to perform operations to implement the present disclosure. Host server can communicate with client device 204 over network 210 by sending and receiving data.

Network 210 can be any type of communications network, such as a local area network (e.g., intranet), wide area network (e.g., Internet), or some combination thereof and can include any number of wired or wireless links. In general, communication between the host server 202 and a client device 204 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). Preferably, however, client device 204 can freely move throughout the world and communicate with host server 202 is a wireless fashion.

Host server 202 can be coupled to or in communication with one or more databases, including a database providing an index of historical location data 218, current IP address data 219, a geographic information system 220, and external content 222. Although databases 218, 219, 220, and 222 are depicted in FIG. 3 as external to host server 202, one or more of such databases can be included in memory 214 of host server 202. Further, databases 218, 219, 220, and 222 can each correspond to a plurality of databases rather than a single data source. For example, with user consent, historical location data database 218 can correspond to or any suitable database from which historical location data can be extracted including a web browsing history database, a search history database, a maps history database, an address book database, an email archive database, a calendar entry database, or any other database associated with the aforementioned user accounts.

According to an aspect of the present disclosure, historical location data database 218 can store or provide a plurality of user historical location data which can be respectively associated with a plurality of user accounts. For example, after being informed of what data is collected, how it is collected, and how such data is used, a user having a user account can elect to participate in location reporting.

In particular, when a user elects to participate and has signed into her user account with respect to one or more of client devices 204, 206, and 208, then such client device or a database associated with the user account accessible by such client device can periodically send a location update to host server 202 over network 210. For example, each location update can identify the presently active user account and a unique device identifier that corresponds to the device providing the update. Each location update can further include a location (e.g. latitude and longitude) and a timestamp identifying the date and time of day. In some implementations, location updates can include an accuracy indicator and/or other identifying information such as an originating IP address. In certain implementations, one or more databases present on client device or associated with the user account accessible by such client device can form historical location database such that the aforementioned information about potential locations is mined from such database directly.

In certain implementations of the present disclosure, with appropriate user consent, historical location data can be in the form of a cookie residing on client device 204. For instance, a web browser of a device can set an HTTP (HyperText Transfer Protocol) cookie. The cookie can store a variety of historical location data, including a unique or semi-unique identifier. The unique or semi-unique identifiers can be anonymized so as to not be connected with user names. Whenever a user performs a web search or uses one or more applications, such as a mapping application, it is possible that such interaction can provide information pertaining to a user's location. For instance, query data associated with a user can be utilized as part of historical location data stored in a cookie or other suitable historical location data database. As described previously, any suitable database can be utilized to collect historical location data and, in certain embodiments, such databases can actually form historical location data database.

The device identifiers used in the historical location data can be any suitable means of identifying particular client devices. For example, exemplary device identifiers include, but are not limited to, manufacturer serial number; MAC address; a device platform string (e.g. Operating System/Device Manufacturer/Device Model/Operational Parameters); IP address; an ID code provided from device memory; or any other suitable device identifier.

Current IP address data database 219 can obtain IP address data associated with a request received from a client device proximate to the time in which at which a user location is to be determined. For instance, current IP address database can obtain IP address data at the time request is received from client device.

As described herein, a plurality of locations can be identified from historical location data and current IP address data and can be scored in an effort to approximate the confidence of such locations based upon related information associated with such locations. For example, historical location data age and frequency can be utilized to score locations derived from such information. For current IP address data, confidence can be calculated when preparing geographic mappings or using other methods as would be understood in the art.

Once the plurality of locations have been scored independently, exact or near duplicate locations can be identified to form clusters. In this regard, a cluster can be formed by two or more locations located within a predefined distance from one another. For instance, in certain aspects of the present disclosure, the predefined distance can be less than or equal to 100 km. In still other aspects of the present disclosure, the predefined distance can be less than or equal to 75 km. In certain embodiments of the present disclosure, the predefined distance can be less than or equal to 50 km. In still other embodiments of the present disclosure, the predefined distance can be less than or equal to 25 km.

Scores for locations that form clusters can be adjusted such that the locations are made more prominent. The overall scores can be compared for all of the locations and the location with the highest score, adjusted or not, can be selected.

Geographic information system 220 can store or provide geospatial data to be used by host server 202. Exemplary geospatial data includes geographic imagery (e.g., digital maps, satellite images, aerial photographs, street-level photographs, synthetic models, etc.), tables, vector data (e.g. vector representations of roads, parcels, buildings, etc.), point of interest data, or other suitable geospatial data. Geographic information system 220 can be used by host server 202 to provide navigational directions, perform location-specific point of interest searches, or any other suitable use or task required or beneficial for providing location-enhanced services.

Computer based system 200 can further include external content 222. External content 222 can be any form of external content including news articles, webpages, video files, audio files, written descriptions, ratings, game content, social media content, photographs, commercial offers, or other suitable external content. Host server system 202 and client device 204 can access external content 222 over network 210. External content 222 can be searched by host server 202 according to known searching methods and can be ranked according to relevance, popularity, or other suitable attributes, including location-specific filtering or promotion.

Figure 3A:
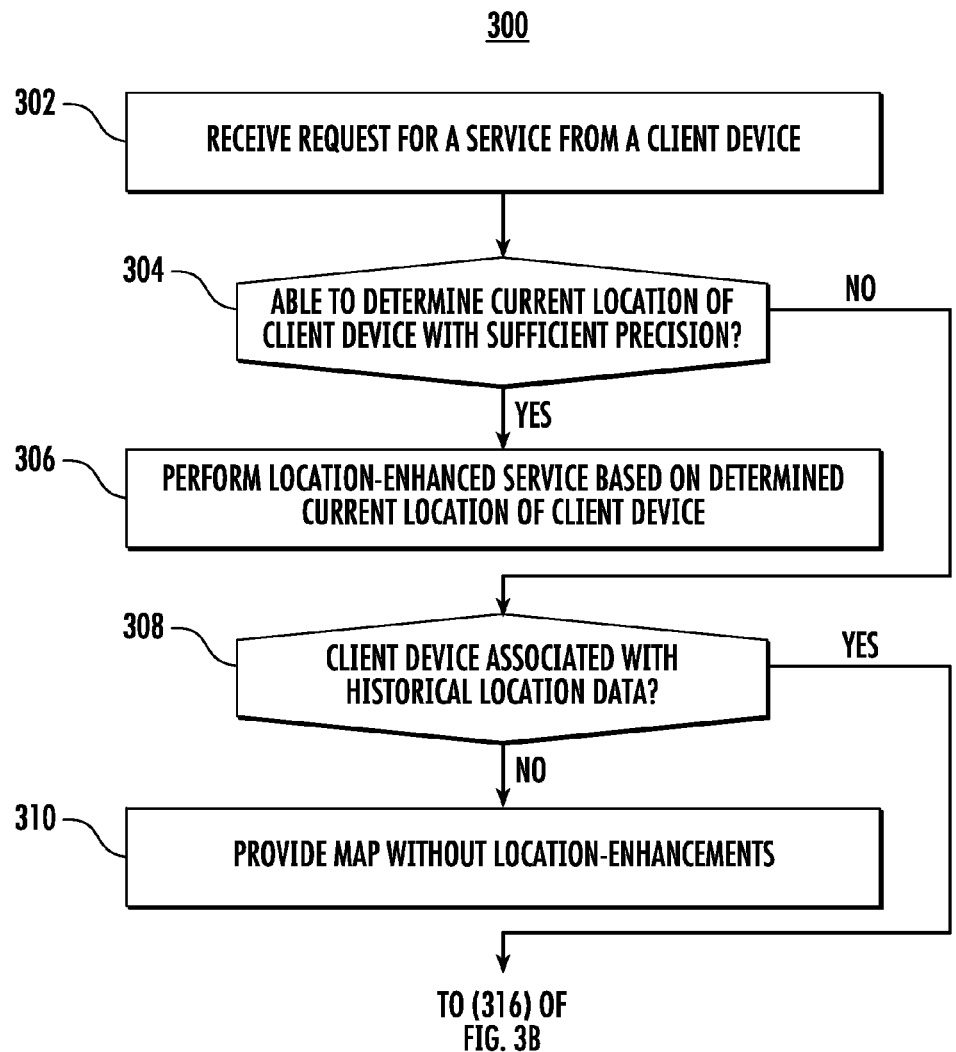
FIGS. 3A and 3B depict a flowchart of an exemplary method for approximating a current location of a client device based on an analysis of historical location data and current IP address data according to an exemplary embodiment of the present disclosure.
Figure 3B:
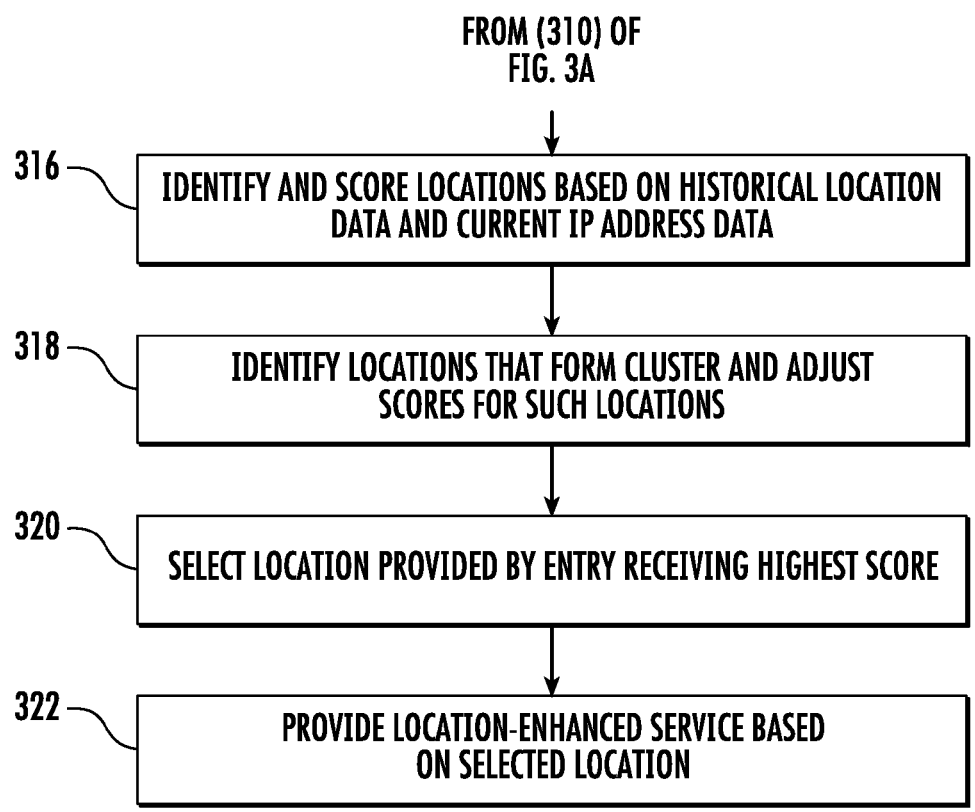

FIGS. 3A and 3B depict a flowchart of an exemplary method (300) for approximating a current location of a client device based on an analysis of historical location data and current IP address data according to an exemplary embodiment of the present disclosure.

While exemplary method (300) will be discussed with reference to the system 200 of FIG. 2, method (300) can be implemented using any suitable computing system. In addition, although FIGS. 3A and 3B depict steps performed in a particular order for purposes of illustration and discussion, methods of the present disclosure are not limited to such particular order or arrangement. One skilled in the art, using the disclosures provided herein, will appreciate that various steps of the method (300) can be omitted, rearranged, combined, and/or adapted in various ways without deviating from the scope of the present disclosure.

Referring to FIG. 3A, at (302) a request for a service can be received from a client device. For example, host server can receive a request from client device 204 to provide point of interest search results in a mapping application. However, a desired location to search for points of interest may be ambiguous.

At (304) it is determined whether the current location of the client device is able to be determined with sufficient precision. As an example, positioning system 238 of client device 204 can operate to provide geolocation of client device 204 according to any known techniques, such as GPS. However, in some instances such geolocation techniques may not be available or otherwise fail to identify a particular location with sufficient precision.

If the current location of the client device is able to be determined with sufficient precision at (304), then method (300) can proceed to (306) and perform the requested location-enhanced service based on such determined current location of the client device. For example, host server 202 can utilize geographic information system 220 to provide location-specific point of interest search results.

However, if it is determined at (304) that the current location of the client device cannot be determined with sufficient precision, the method (300) can proceed to (308).

At (308) it can be determined whether the client device is currently signed into or otherwise presently associated with a user account or otherwise associated with historical location data. For example, session cookies or other indicators can be analyzed to determine and identify a presently active user account.

If it is determined at (308) that the client device is not associated with historical location data, then at (310) the service can be provided without location-enhancements. For example, host server 202 might provide location-agnostic search results or might request a further narrowing of the target search location.

However, if it is determined at (308) that the client device is associated with historical location data, then method (300) can proceed at (316).

Referring now to FIG. 3B, at (316) a plurality of locations can be identified based upon historical location data and current IP address data. For example, historical location data can include historical internet protocol address data associated with the user account of client device, historical query data, or the like. In addition, the request received at (302) can include or otherwise be associated with current IP address data. A confidence score can be obtained or computed for each of the plurality of locations associated with historical location data and current IP address data. Host server 202 can obtain or otherwise access the plurality of locations from historical location data in database 218 and current IP address data in database 219.

At (316) each of the plurality of locations can be scored according to a scoring formula. The scoring formula can score each location on a number of criteria or parameters to provide a general indication of whether it is reasonable to use the location provided by historical location data or current IP address data as the current location of the client device. A location that receives a higher score can be more likely to express a probability of consensus of the current user location (based on the location of the client device) and the location associated with the score.

As an example, the scoring formula used at (316) can provide a score to a location based at least in part on the age of the data from which the location is derived. More recent data is more likely to accurately reflect the current location of the client device while older data is less likely to accurately reflect the current location of the client device. Thus, for example, an age component of the scoring formula can decay over time. For example, a data that is over five days old can result in any associated location being scored very low.

In other implementations, the age component of the scoring formula does not operate in units of time but rather analyzes a position of the location being scored within the historical location data. For example, if a device identifier has four associated historical location data points, the entry in the fourth position (i.e. oldest) would receive a lower score than the entry in the first position.

Other parameters or attributes of historical location data and current IP address data can be analyzed by a suitable scoring formula as well. In addition, the scoring parameters discussed above can be considered in isolation or in other combinations and are not necessarily used at a single time to provide a single score.

Furthermore, weightings, coefficients, or other components of the scoring formula can be trained against data having a known accuracy or categorization. As an example, one or more regression analyses can be performed with respect to a provided set of location data having known classifications as accurate or inaccurate.

Turning again to FIG. 3B, at (318) clusters of locations from the plurality of locations being scored can be identified and scores for locations in the cluster can be adjusted by a weight associated with the cluster. For instance, locations within a certain predetermined distance from one another can be considered a cluster and scores associated with such locations can be increased based upon a weight associated with such a cluster. Thus, if current IP location data points to "Palo Alto" with low confidence, but historical location data identifies "Stanford", both location scores can be increased to make such locations more prominent.

After the plurality of locations has been scored according to the scoring formula at (316) and (318), at (320) the location provided by the entry that received the highest score can be selected as the current location of the client device. At (322) the location-enhanced service can be provided based on the location selected at (320).

Thus, locations included in historical location data and current IP address data can be scored according to a scoring formula designed to identify the most appropriate replacement for an unknown position of a client device. Therefore, a service provider will be able to routinely provide location-enhanced services despite being unable to determine a precise location of the client device using traditional geolocation techniques.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for approximating a user location, the method comprising:

accessing, with one or more computing devices, information associated with a user location, the information comprising historical location data and current internet protocol address data;

analyzing, with the one or more computing devices, the historical location data and internet protocol address data to identify a plurality of locations associated with the information;

determining, with the one or more computing devices, a confidence score for each of the plurality of locations, the confidence score expressing a probability of the consensus of the user location with the location associated with the confidence score;

identifying, with the one or more computing devices, two or more locations of the plurality of locations that form a cluster, wherein a cluster comprises two or more locations located within a predefined distance from one another; and modifying, with the one or more computing devices, the confidence scores for each of the two or more locations that form a cluster by adjusting each confidence score by a weight associated with the cluster.

2. The computer-implemented method of claim 1, further comprising ranking the plurality of locations based upon the confidence score or modified confidence score, if available, for each of the plurality of locations.

3. The computer-implemented method of claim 1, wherein the historical location data comprises one or more of historical location data for a device associated with the user, historical internet protocol address data associated with the user, or historical query data associated with the user.

4. The computer-implemented method of claim 1, wherein the current internet protocol address data is obtained by geolocation of an internet protocol address associated with a request received from a client device associated with the user.

5. The computer-implemented method of claim 1, wherein the predefined distance is less than or equal to 100 km.

6. The computer-implemented method of claim 1, wherein the predefined distance is less than or equal to 75 km.

7. The computer-implemented method of claim 1, wherein the predefined distance is less than or equal to 50 km.

8. The computer-implemented method of claim 1, wherein the predefined distance is less than or equal to 25 km.

9. The computer-implemented method of claim 1, wherein each confidence score is based at least in part on an age, prominence, location consistency, or combinations thereof, of the information.

10. A system for approximating a user location, comprising:
   one or more computing devices; and
   at least one memory storing instructions that, when executed by the one or more computing devices, cause the one or more computing devices to perform operations, the operations comprising:
      accessing information associated with a user location, the information comprising historical location data and current internet protocol address data;
      analyzing the historical location data and internet protocol address data to identify a plurality of locations associated with the information;
      determining a confidence score for each of the plurality of locations, the confidence score expressing a probability of the consensus of the user location with the location associated with the confidence score;
      identifying two or more locations of the plurality of locations that form a cluster, wherein a cluster comprises two or more locations located within a predefined distance from one another; and
      modifying the confidence scores for each of the two or more locations that form a cluster by adjusting each confidence score by a weight associated with the cluster.

11. The system of claim 10, wherein the predefined distance is less than or equal to 100 km.

12. The system of claim 10, wherein the predefined distance is less than or equal to 25 km.

13. The system of claim 10, wherein each confidence score is based at least in part on an age, prominence, location consistency, or combinations thereof, of the information.

14. A non-transitory computer-readable medium storing instructions that, when executed by one or more computing devices, cause the one or more computing devices to perform operations, the operations comprising:
   accessing information associated with a user location, the information comprising historical location data and current internet protocol address data;
   analyzing the historical location data and internet protocol address data to identify a plurality of locations associated with the information;
   determining a confidence score for each of the plurality of locations, the confidence score expressing a probability of the consensus of the user location with the location associated with the confidence score;
   identifying two or more locations of the plurality of locations that form a cluster, wherein a cluster comprises two or more locations located within a predefined distance from one another; and
   modifying the confidence scores for each of the two or more locations that form a cluster by adjusting each confidence score by a weight associated with the cluster.

15. The non-transitory computer-readable medium of claim 14, wherein the operations further comprise ranking the plurality of locations based upon the confidence score or modified confidence score, if available, for each of the plurality of locations.

16. The non-transitory computer-readable medium of claim 14, wherein the historical location data comprises one or more of historical location data for a device associated with the user, historical internet protocol address data associated with the user, or historical query data associated with the user.

17. The non-transitory computer-readable medium of claim 14, wherein the predefined distance is less than or equal to 100 km.

* * * * *